United States Patent [19]

Espinosa et al.

[11] Patent Number: 4,460,862
[45] Date of Patent: Jul. 17, 1984

[54] ELECTRONIC SPEED AND SLOWING DOWN CONTROL WITH INTRINSEC SAFETY

[76] Inventors: Fausto L. Espinosa, Braque #4284; Ramón R. Alejandre, San Aristeo #2238, both of Guadalajara, Jalisco, Mexico

[21] Appl. No.: 263,913

[22] Filed: May 15, 1981

[30] Foreign Application Priority Data

May 20, 1980 [MX] Mexico .................................. 182394

[51] Int. Cl.³ .......................... H02P 3/22; H02P 3/20
[52] U.S. Cl. ..................................... 318/741; 318/732; 318/758
[58] Field of Search ............ 318/732, 6, 741, 721–723, 318/758–761

[56] References Cited

U.S. PATENT DOCUMENTS

| | | | |
|---|---|---|---|
| 3,227,937 | 1/1966 | Koppelman et al. | 318/759 |
| 3,348,110 | 10/1967 | Koppelman | 318/760 |
| 3,699,416 | 10/1972 | Sloan et al. | 318/761 |
| 3,810,253 | 5/1974 | Vergara et al. | |
| 4,140,951 | 2/1979 | Greenhough | 318/822 |

*Primary Examiner*—David Smith, Jr.
*Attorney, Agent, or Firm*—Anthony A. O'Brien

[57] ABSTRACT

An electronic system is disclosed for controlling both the ascendant and the descendant speed in vertical machines such as cranes, elevators, etc., in which it is required to lift different loads in a regulated and self-controlled manner, laying aside the traditional mechanical and/or pneumatic control systems. Such control is achieved by virtue of the voltages included in the secondary of the motors of the wound rotor type used in such machines to lift or to bring down different loads, which may vary within a wide range from practically the vacuum to an overload, being possible by such control to select and to maintain both the ascendant and the descendant speed of the load.

2 Claims, 4 Drawing Figures

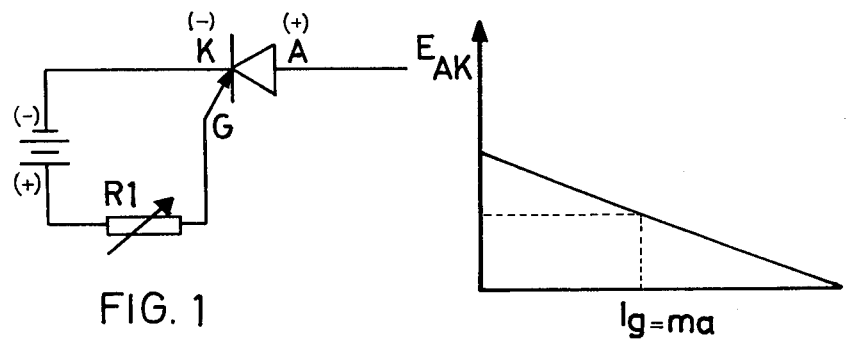
FIG. 1
FIG. 2
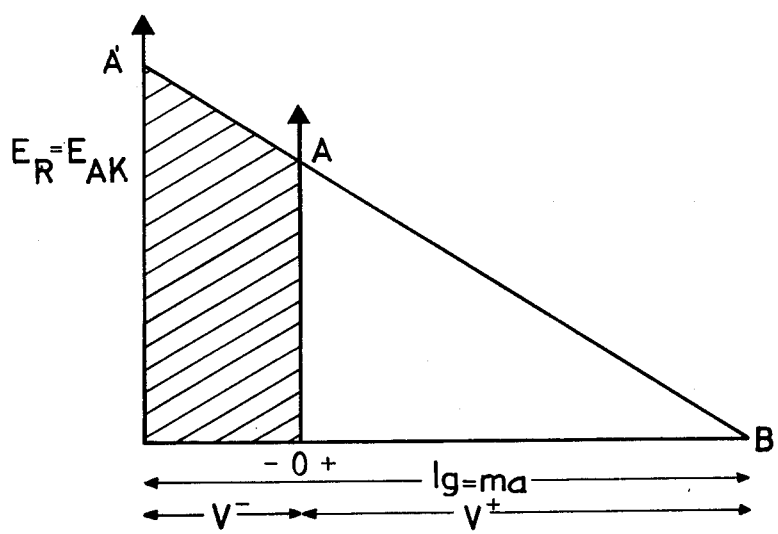
FIG. 3
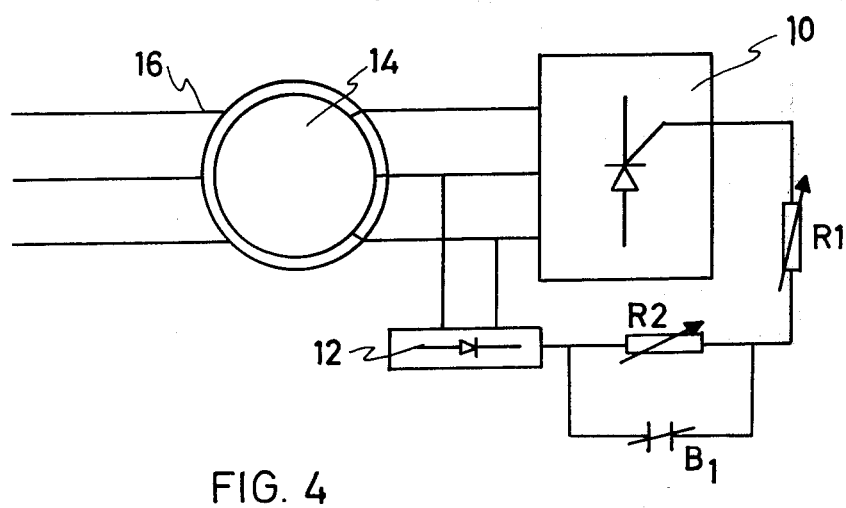
FIG. 4

ELECTRONIC SPEED AND SLOWING DOWN CONTROL WITH INTRINSEC SAFETY

BACKGROUND OF THE INVENTION

The present invention relates to an electronic speed control for a motor and more particularly, to such a control for a motor which raises and lowers loads.

The prior art as exemplified by U.S. Pat. No. 3,810,253 discloses an electronic circuit for controlling the speed of a three phase motor of the wound rotor type, which circuit includes a plurality of electronic elements each adapted to regulate the amount of alternating current passed therethrough and induced to an associated phase of the rotor. The electronic elements provide a controlled short circuiting for all three phases of the rotor due to the setup of unidirectional current paths related to the biasing of the current. Each electronic element has a gate electrode connected to a master control circuit to be enabled thereby and thus pass a controlled current in the appropriate amount and at the precise time with a substantial suppresion of the Joulean effect. The control circuit is integral within a motor housing and rotates with a shaft supporting the rotor. Slip rings may be utilized to provide electrical connections between the gate electrodes and the master control circuit which may be also exterior of the motor housing.

In order to decrease the time required to raise and lower loads with cranes, devices formed by pulleys, hoists, elevators, etc., the industry of vertical transportation has developed a multiplicity of braking systems, which have used different types of signals controlled by micro-switches, photo-cells, tachometers, comparative circuits, etc., with the view to achieve an effective braking deceleration on the descendant load, such systems constituting, as it might be the case, complex and therefore expensive installations.

All the systems used up to date seek as a main purpose a high efficiency as well as a security during its operation, governing the descendant speed through all the course of the load. Thus, the prior art requires the addition of further equipments and circuits which are complex in their structures and designs, to control the descent of the lifted loads, so excessively increasing the total price of the equipment.

SUMMARY OF THE INVENTION

This invention consists of a circuit to control the speed of three phase motors of the wound rotor type, such circuit being modified to control the speed of those motors when they are used to bring down a load, using thereto the induced voltages in the rotor or secondary of said motor, when it rotates in a reverse sense by action of the potential energy contained in the previously lifted load. The modification to the control circuit to push the load up, is that of the inclusion of a further resistance which makes that the discharge signal to the gates of the thyristors forming the motor speed control circuit be triggered at a higher induced voltage. In this manner, such modified speed control may choose and maintain a descendant speed of the load at a predeterminated rate independent from the potential energy contained in the load to be brought down.

OBJECTS OF THE INVENTION

It is therefore an object of the invention to provide a circuit to control in an effective manner a load descent, without modifying in a substantial form the circuit to control the speed of a three phase motor of the wound rotor type.

It is another object of the invention to provide a braking circuit to be used both, to control in a regulating manner, the ascendant and the descendant speed of a load, without adding or substantially modifying the ascendant control circuit.

It is still a further object of the invention to provide a circuit with intrinsic security to control the descendant speed of a load.

BRIEF DESCRIPTION OF THE DRAWINGS

FIG. 1 is a circuit diagram in schematic form illustrating the operation of a controlled diode;

FIG. 2 is a graph illustrating the reaction of a controlled diode by virtue of the voltage applied to its ends and of the electron flow applied to its gate to carry the diode;

FIG. 3 is a graph representing the existing ratio in the induced voltage in the rotor of a three phase motor of the wound rotor type, the speed of such rotor and the electron flow of the controlled diodes forming the speed control circuit of said motor; and FIG. 4 is a block diagram of the circuit to control the speed of the motor when it lifts a load and when it brings down a load.

DESCRIPTION OF THE PREFERRED EMBODIMENT

The circuit for speed control 10 illustrated in blocks in FIG. 4 of the accompanying drawing is one of the type shown in U.S. Pat. No. 3,810,153. With reference to FIG. 4, the control 10 jointly with $R_1$ and with the master control circuit 12, form the circuit to control the speed of the rotor 14 of the three phase motor of the wound rotor type 16, to effect a controlled ascension or for any other application in which a precise control on the operation speed of said motor, and therefore its developed operation is required.

The above mentioned circuit, in a summary description, is constituted by a plurality of electronic elements or thyristors fixedly mounted with respect to the motor shaft and connected by their respective cathodes and anodes to pairs of the three phases of the rotor of the motor, so as to make a number of unidirectional current flow paths, when actuated, between all three phases of the rotor. Each electronic element has a gate connected to the master control circuit through slip rings. The flow of current is controlled by actuating the gates of the electronic elements to cause the short circuit of the current flow in the three phases of the rotor, all such as described in the above mentioned U.S. Pat. No. 3,810,253.

The present invention constitutes an improvement to the circuit of U.S. Pat. No. 3,810,253.

As shown in FIG. 1, a current flow is applied to the gate G of a thyristor to attain the conduction between its elements cathode (k) and anode (a) as well as the thyristor polarity shown in the elemental circuit represented thereon.

In FIG. 2 there is constituted the relationship existing between the voltage $E_{AK}$ applied between the cathode K and the anode A of the thyristor and its gate current flow Ig, in which it is shown that such parameters are inversely proportional with each other and that each voltage rate existing between thyristor cathode and anode, has in strict sense a current flow rate in its gate to conduct to such thyristor.

Superimposed on FIG. 3 there is the representation of how a controlled diode works when it receives a voltage $E_R$ proceeding from the secondary of a motor of the wound rotor type in connection with the gate current flow Ig applied to said controlled diode, as well as said voltage $E_R$ in connection with the speed V developed by the rotor of such motor, from which it is deduced that the rotor speed is also inversely proportional to the induced voltage in the secondary of the motor.

As disclosed in U.S. Pat. No. 3,810,253, the speed control of a motor of the above mentioned type is attained by considering the inverse relationship existing among the parameters of the induced voltage $E_R$ in the rotor and its voltage V as well as such induced voltage $E_R$ and the triggering signal Ig applied to the gates of the thyristors of the control circuit, which constitutes the speed control illustrated in FIG. 4 by block 10. This situation is illustrated in FIG. 3, in the diagram corresponding to axis A-O and O-B. The above mentioned situation controls the motor speed as it goes forward and where by such circuit it is possible to choose and maintain the motor speed within the range of an equal value from zero to substantially the rotative speed of the electromagnetic field of the stator, which would be equal if the phenomenon so-called "sliding" cosisting in an out-of-phase relationship for the magnetic fields of the rotor and of the stator, would not exist.

While U.S. Pat. No. 3,810,253 obtained a precise control of the "forward" speeds of the three phase motors of wound rotor, an operation that logically may be applied to lift a load, the problem is now how to control the descent of such load by using the same circuit, which problem is solved by the present invention, as is readily apparent from the following description FIGS. 3 and 4 of the accompanying drawings.

In FIG. 3 it is shown that in the vertical axis of the drawing therein illustrated, the value of the rotor speed 14 may adopt negative speeds, that is "Backward" speeds. This situation has been illustrated in the diagram of said figure and corresponds to the moment in which the load comes down, thereby inducing in the secondary of the motor a greater voltage by virtue of the increase in the out-of-phase relationship between the magnetic fields of the stator and of the rotor. Under such a circumstance, it can still control the trigger of the thyristors and make them work by applying to their gates a control signal, which obviously shall be less than the one required to operate the rotor in a forward manner.

As it is now apparent, the Forward control of the motor is attained by regulating the $R_1$ value. As precisely depending upon the flow current value supplied to the gates of the thyristors of control 10, a broad margin is obtained in the speed value, which goes from zero up to substantially the rotational speed of the electromagnetic field of the stator. To effect the controlling of the thyristors trigger when there is a greater tension between its cathodes and its anodes, it will only be required to decrease the gate flow current Ig value, which may be attained by the addition in the control circuit of the resistance $R_2$, thereby achieving a precise control of the backwards speed of the motor, independent of the value of the load to be brought down.

In the diagram of FIG. 3 it is shown that in the descent of the load the induced voltage in the rotor is directly proportional to the rotor backward speed since while the stator magnetic fields rotate in one forward direction and the rotor rotates backward by action of the weight of the load, the out-of-phase magnetic fields of the stator and of the rotor increase. This induces a greater voltage in the rotor, which being still energized to go forward, rotates in a reverse sense by action of the load, thus being enough to increase or to decrease the value of $R_2$ to bring down the load at a pre-determined speed. The resistance $R_2$ is introduced as a control element in the load descent, by only opening the small switch $B_1$; as it is shown in FIG. 4, it conducts only flow current values in the range of the order or microamperes. When the small switch $B_1$ is closed, the resistance $R_2$ is suppressed and then the circuit controls and establishes the forward speed of the motor.

From the above description it is evident that according to the present invention, the circuit to control the motor operation achieves a precise control in its application to control the descent of a load in all those equipments such as cranes, devices formed by pulleys for raising heavy bodies, elevators, etc., which use in their operation a three phase motor of wound rotor.

Inasmuch as the present invention is subject to many modifications, variations and changes in details, it is intended that all matter contained in the foregoing description or shown on the accompanying drawing shall be interpreted as illustrative and not in a limiting sense.

What is claimed is:

1. An improved system for controlling the speed of a plural phase induction motor rotating in both forward and backward directions having a rotor assembly including a plurality of rotor windings comprising:

current control means, including a main current path and a control element for controlling current in the main path in response to the application of a signal of a given polarity to the control element;

said current control means having a main current path connected across said rotor windings for controlling current flow therein;

circuit means energized by said rotor windings;

a first resistance element connecting said circuit means to said control element;

said circuit means continuously applying a direct current signal having said given polarity to said control element which varies in amplitude in response to changes in rotor winding voltage due to instantaneous motor speed variations;

wherein the improvement comprises:

a second resistance element controlling the motor rotor speed when the motor rotates in a backward direction, connected in series with said first resistance element; and a normally closed switch connected in parallel with said second resistance element and adapted to form an open circuit when the motor rotates in a backward direction to thereby establish said second resistance element in series with said first resistance element.

2. The system according to claim 1 wherein said first and second resistance elements are variable resistances.

* * * * *